T. L. EASLEY.
CHANGEABLE EXHIBITOR.
APPLICATION FILED SEPT. 25, 1919.
1,405,767.
Patented Feb. 7, 1922.
8 SHEETS—SHEET 1.
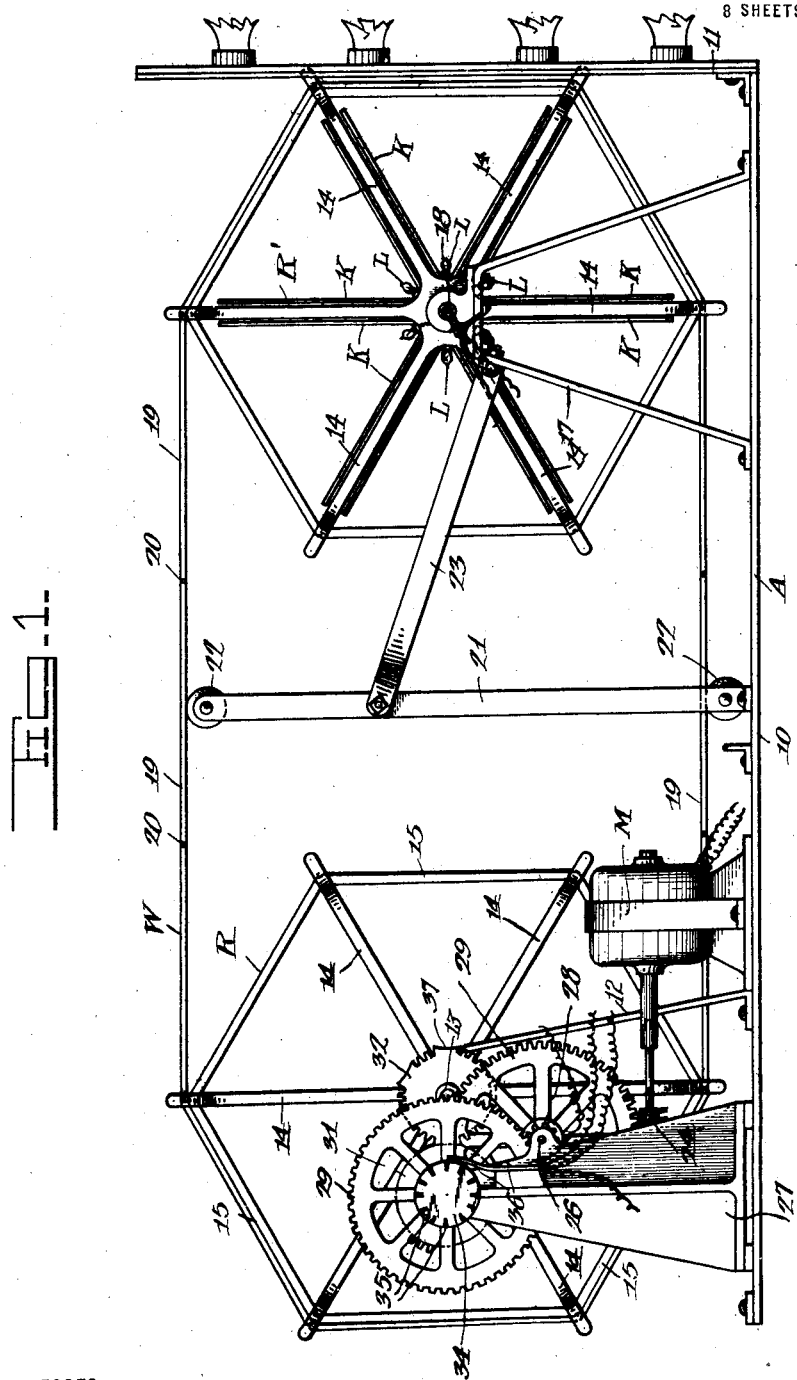
WITNESSES
John P. Woodworth
E. H. Jones.
INVENTOR:
T. L. Easley.
BY
ATTORNEYS

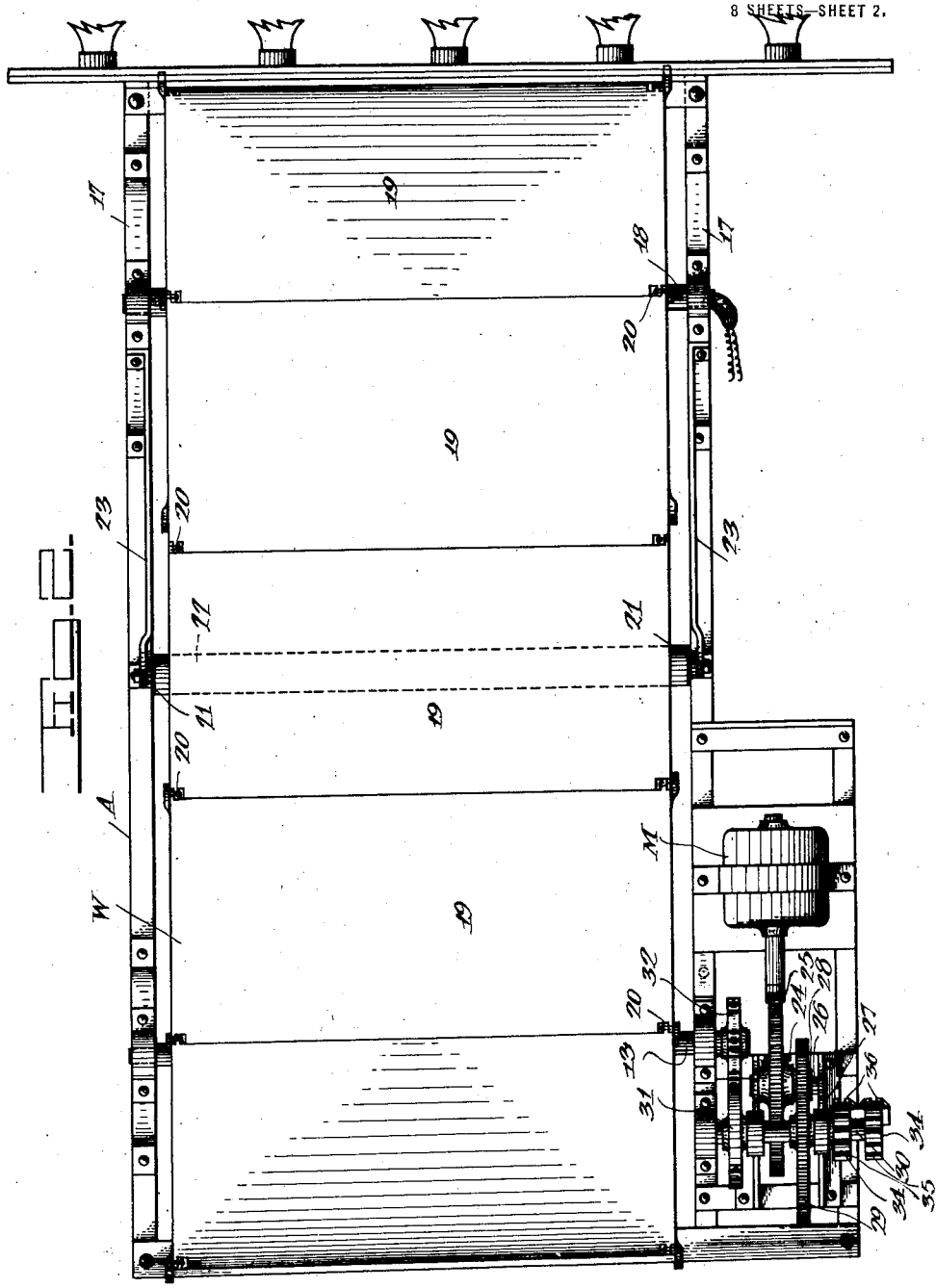

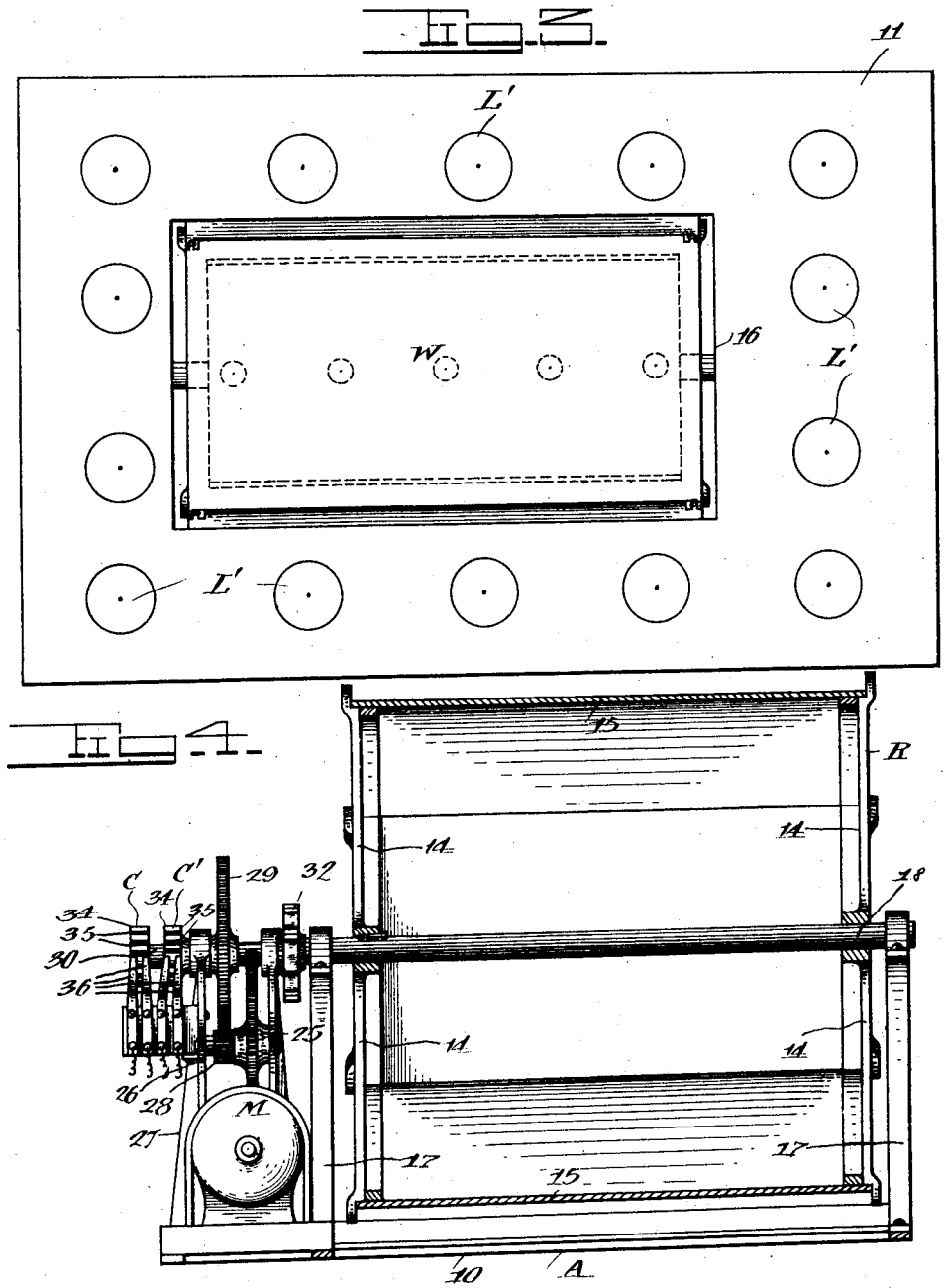

T. L. EASLEY.
CHANGEABLE EXHIBITOR.
APPLICATION FILED SEPT. 25, 1919.
1,405,767.
Patented Feb. 7, 1922.
8 SHEETS—SHEET 4.
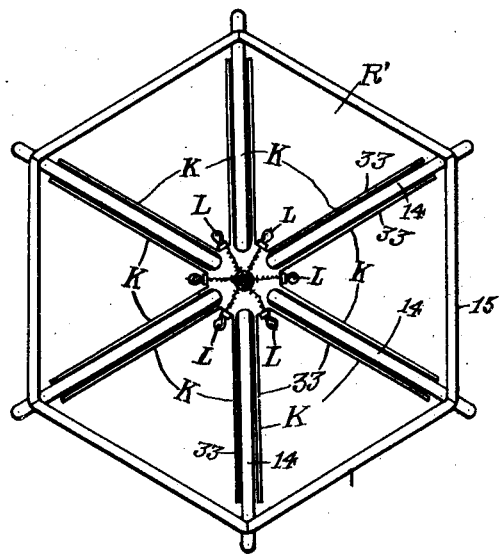
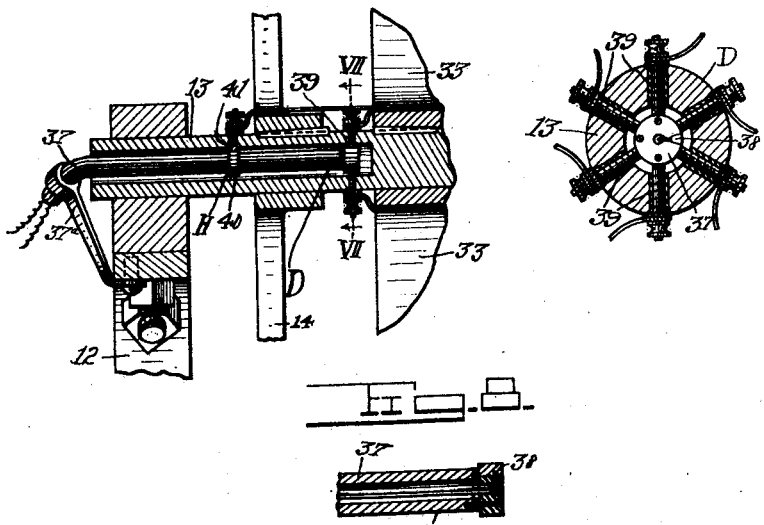
WITNESSES
John P. Woodworth
T. L. Easley, INVENTOR
BY
ATTORNEYS

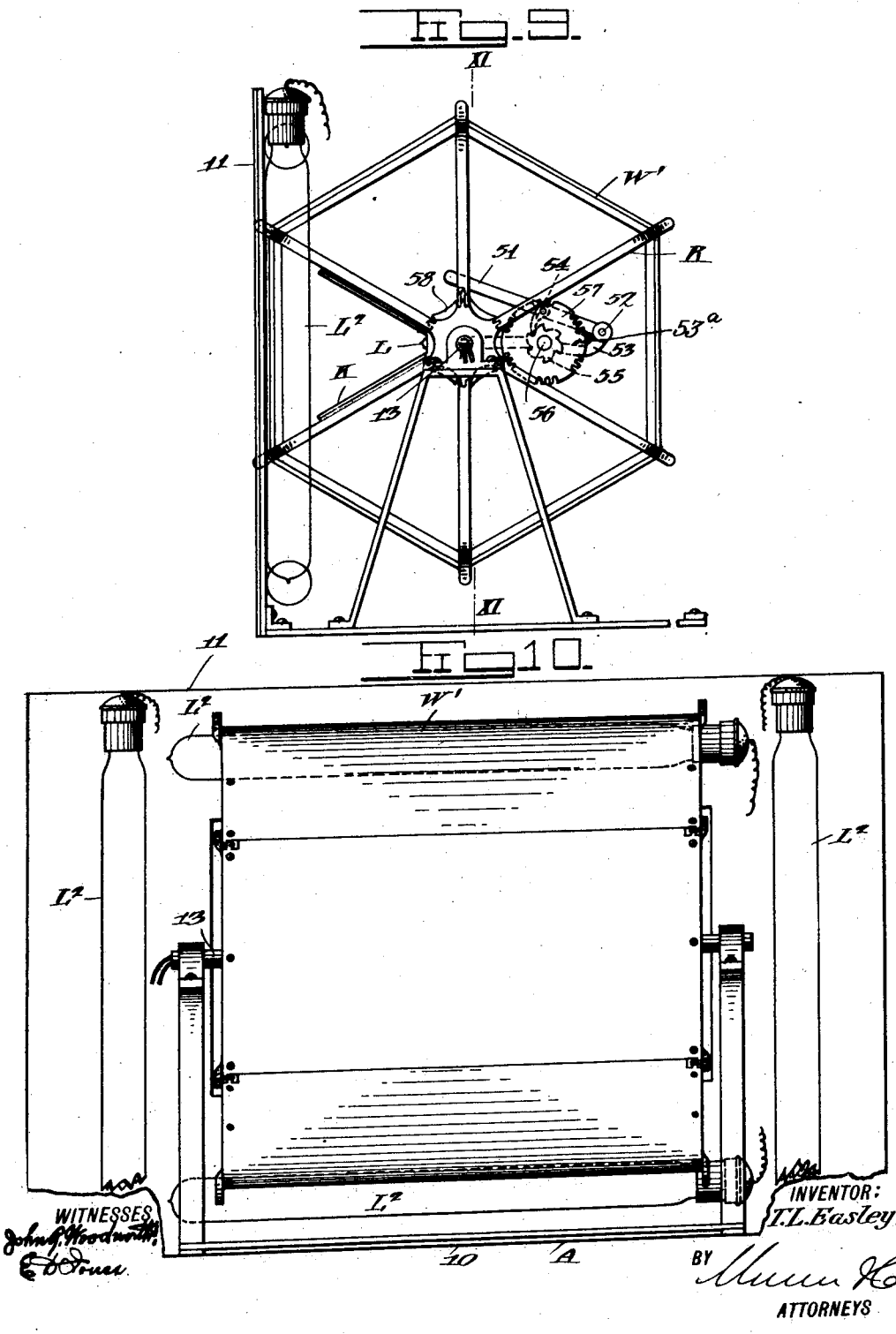

T. L. EASLEY.
CHANGEABLE EXHIBITOR.
APPLICATION FILED SEPT. 25, 1919.
1,405,767.
Patented Feb. 7, 1922.
8 SHEETS—SHEET 6.
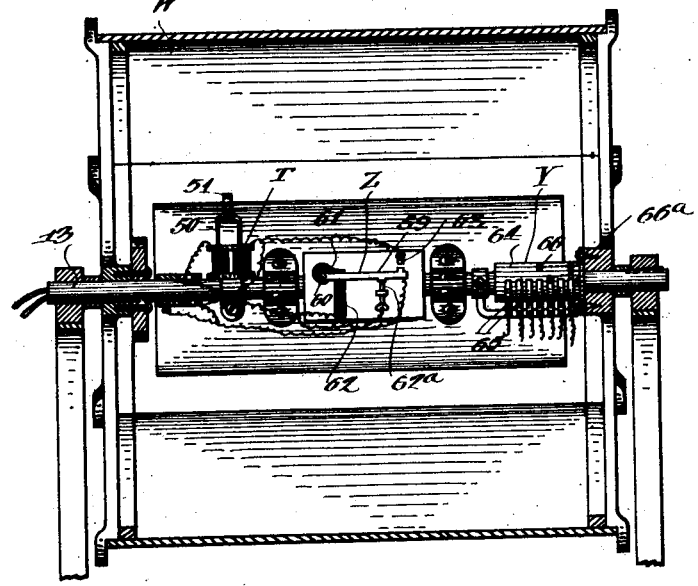
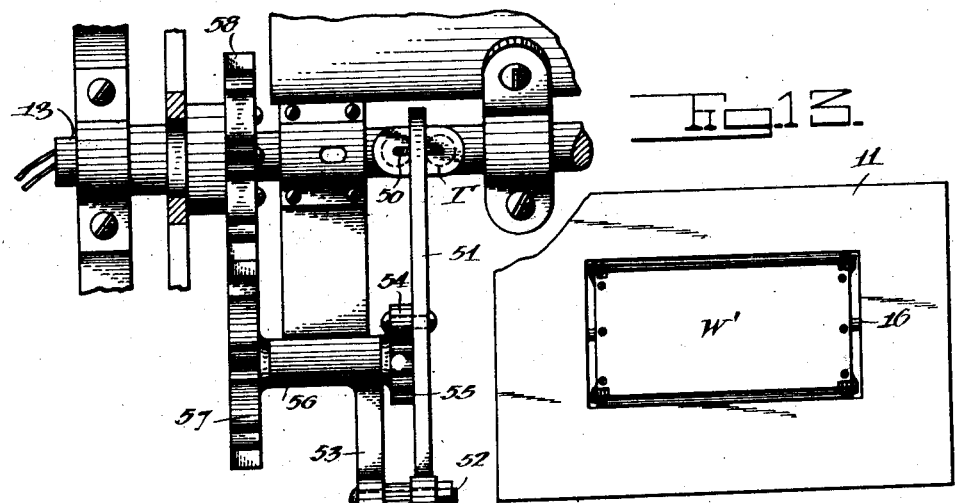
T. L. Easley, Inventor:
WITNESSES
By Munn & Co
Attorney

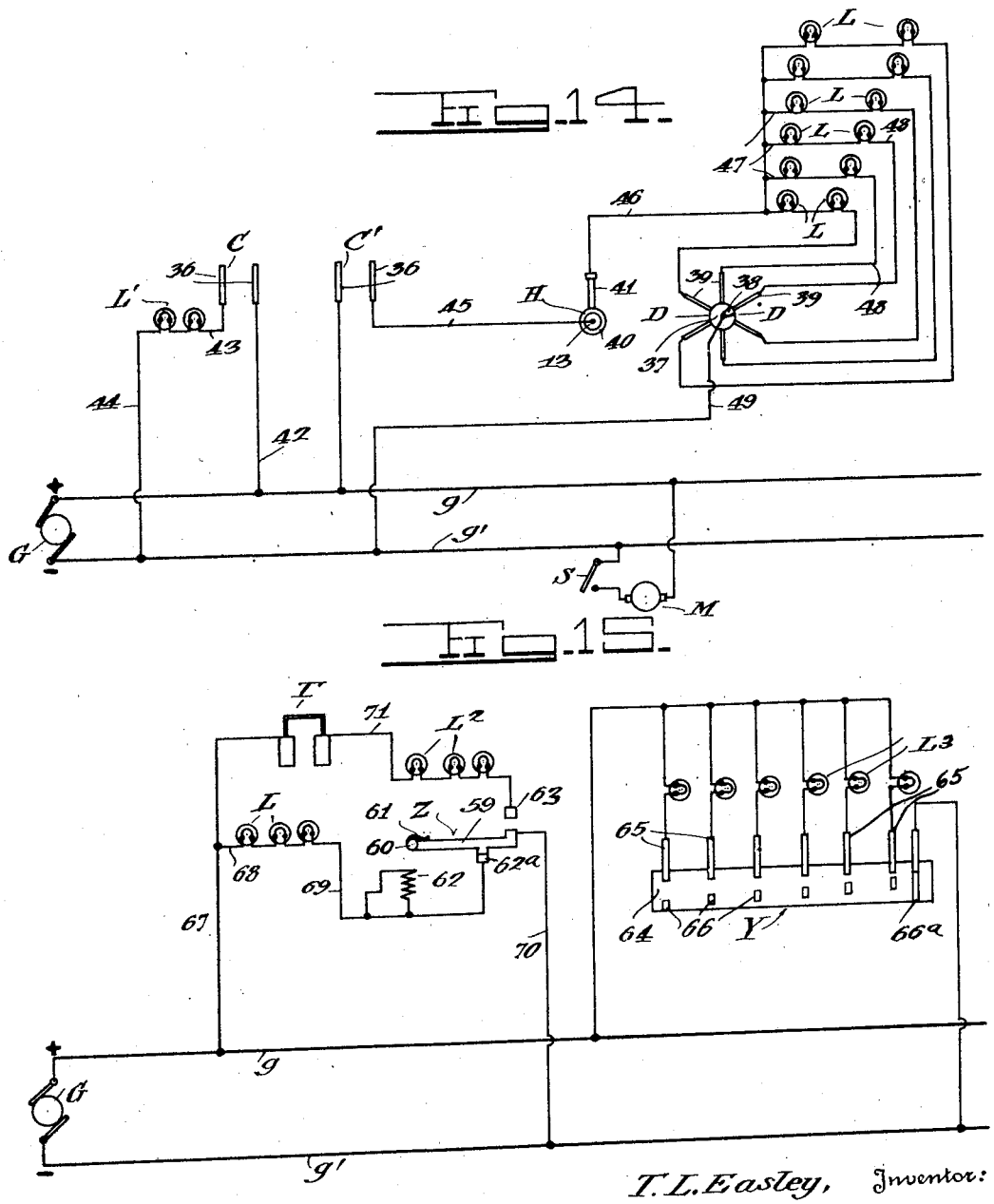

T. L. EASLEY.
CHANGEABLE EXHIBITOR.
APPLICATION FILED SEPT. 25, 1919.

1,405,767.

Patented Feb. 7, 1922.
8 SHEETS—SHEET 8.

WITNESSES
John P. Woodworth

T. L. Easley, INVENTOR

BY Munn &co.
ATTORNEYS

UNITED STATES PATENT OFFICE.

THOMAS LARIMORE EASLEY, OF SAN ANTONIO, TEXAS, ASSIGNOR OF ONE-HALF TO WILLIAM NAGEL, OF SAN ANTONIO, TEXAS.

CHANGEABLE EXHIBITOR.

1,405,767.      Specification of Letters Patent.      Patented Feb. 7, 1922.

Application filed September 25, 1919. Serial No. 326,139.

*To all whom it may concern:*

Be it known that I, THOMAS LARIMORE EASLEY, a citizen of the United States, and a resident of San Antonio, in the county of Bexar and State of Texas, have made certain new and useful Improvements in Changeable Exhibitors, of which the following is a specification.

My invention relates to signs, and particularly to that type commonly known as changeable exhibitors, wherein a plurality of signs are intermittently and successively displayed.

An object of my invention is the provision of a changeable exhibitor in which the arrangement of the reels and web is such that the number of signs which are successively and intermittently displayed is materially increased without appreciably increasing the number of parts of the mechanism.

Another object of my invention is the provision of an exhibitor in which the sign web is transparent and is alternately illuminated interiorly and exteriorly, so that at no instant is the sign invisible.

I will describe three forms of changeable exhibitors embodying my invention, and will then point out the novel features thereof in claims.

In the accompanying drawings:

Figure 1 is a view showing in side elevation one form of exhibitor embodying my invention;

Figure 2 is a top plan view of the exhibitor shown in Figure 1;

Figure 3 is a view showing in front elevation the exhibitor shown in the preceding views;

Figure 4 is a vertical sectional view taken centrally of the driven reel shown in the preceding views, with the actuating mechanism in end elevation;

Figure 5 is a detail view showing in end elevation the driven reel shown in the preceding views and embodying my invention;

Figure 6 is a fragmentary sectional view of the left hand end of the driven reel shaft;

Figure 7 is a sectional view taken on the line VII—VII of Figure 6;

Figure 8 is a detailed view of one of the movable contacts shown in Figure 6;

Figure 9 is a view showing in side elevation another form of changeable exhibitor embodying my invention;

Figure 10 is a view showing in rear elevation the exhibitor shown in Figure 9;

Figure 11 is a vertical sectional view taken substantially on the line XI—XI of Figure 9;

Figure 12 is a fragmentary top plan view of a portion of the driving means for the reel shown in Figures 9, 10 and 11;

Figure 13 is a detailed view showing the front wall of the housing of the exhibitor shown in Figure 9;

Figure 14 is a diagrammatical view of the apparatus for controlling the illumination of the lamps shown in the first form of exhibitor and embodying my invention;

Figure 15 is a diagrammatical view of the apparatus for controlling the driving mechanism and the illumination of the lamps in the second form of exhibitor, and embodying my invention;

Similar reference characters refer to similar parts in each of the several views.

Figure 17:
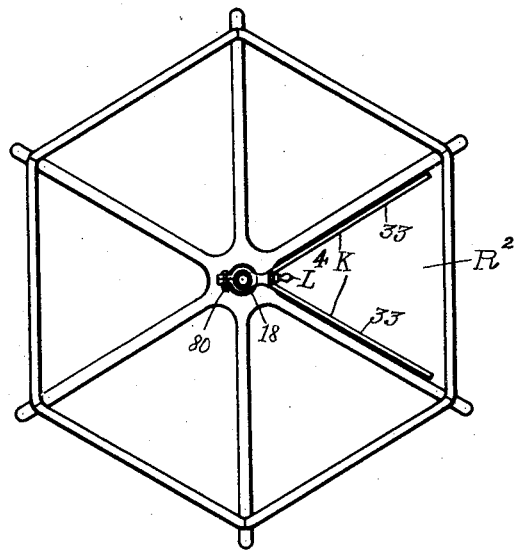
Figure 17 is a view showing in end elevation another form of driven reel and reflector which can be substituted for the driven reel shown in Figure 1.

Referring specifically to the drawings and particularly to the form shown in Figures 1 to 8, inclusive, A designates generally a housing for the exhibitor, but to simplify the drawings I have shown only a base frame 10, and the front side wall 11. Secured to the rear end of the base 10 is a pair of spaced standards 12, in the upper ends of which are journaled the opposite ends of a shaft 13. Keyed to the shaft 13 for movement therewith is a driving reel R, which comprises the spiders 14, 14, the spokes of which are rigidly connected adjacent their outer ends by means of bars 15. The arrangement of the bars 15 is such as to provide the reel R with a plurality of angular faces, and in the present instances there being only six spokes to each spider 14, the bars 15 provide a reel having a hexagonal shaped periphery.

Arranged adjacent the forward end of the base frame 10 are standards 17 in which a shaft 18 is journaled. The shaft 18 carries a driven reel R′ which is of the same construction as the driving reel R and is located directly within the rear of the front wall 11 and, as shown in Figure 1, in the normal position of the reel, one of its angular faces is presented to a window 16 formed in the wall 11. Trained around the reels R and R′ is an endless web W, which is composed of sections 19 hingedly connected, as at 20. The sections 19 correspond in length to the width of the angular faces of each reel R and R′ and each section constitutes a sign, it being understood that any matter may be printed or painted thereon. These sign sections 19 are adapted to be successively displayed within the window 16 by driven reel R′, and are adapted to be intermittently displayed by means of mechanism which periodically checks the rotating movement of the reel R′ every 60 degrees. My purpose in providing the driven reel R′ is to allow the employment of an endless sign web, which contains a great number of sign sections, so that the displaying capacity of such an exhibitor is materially increased.

In the present instance, I provide means for supporting that portion of the endless web W, which spans the space between the reels R and R′. This means comprises a pair of uprights 21, which are secured to the base frame 10, and support spaced rollers 22 which bear upon and support the web W as clearly shown in Figure 1. To rigidly hold the uprights 21 in vertical position I provide brace bars 23, which are connected to the standards 17, and the uprights 21, as shown in Figures 1 and 2.

The mechanism for driving the reel R—R′ in the manner previously described, comprises, in the present embodiment, an electric motor M, which is operatively connected to the shaft 13 by means of a worm 24 fixed to the motor shaft and meshing with a gear 25 fixed to a stub-shaft 26 journaled in standards 27. Fixed to the shaft 26 is a pinion 28, which meshes with a gear 29 fixed to a shaft 30. Fixed adjacent the inner end of the shaft 30 is a Geneva-type gear 31 which meshes with a similar gear 32 fixed to the shaft 13. By virtue of the two Geneva-type gears it will be obvious that when the motor M is energized a step by step movement is imparted to the reel R so as to successively and intermittently present the sign sections 19 to the window 16.

In conjunction with the foregoing apparatus I provide lighting means for the interior of the sign web W, which is arranged to direct its rays through the sections 19 as the latter are presented to the window 16. This means comprises several groups of lamps L, the lamps of each group being arranged between the lines defined by adjacent pairs of spokes 14 of reel R′ as shown in Figures 1 and 5. Each group of lamps L is provided with a reflector K, comprising divergent sections 33, which are disposed parallel to the adjacent spokes 14. The arrangement of these reflectors is such that the light rays from each respective group of lamps are directed to and through the sign section and window at intersecting angles, so that the sign presented to the window can be clearly seen from all angles and great distances.

Arranged upon the outer side of the wall 11 and surrounding the window 16 are a plurality of lamps L′ for illuminating the exterior of the sign only when the interior is not illuminated, as will be hereinafter described.

In order to prevent waste of current, and at the same time to always maintain the exhibitor illuminated, I provide a circuit controlling apparatus which causes the lamps L of each group to be illuminated only when the corresponding sign section is in displayed position within the window. The controlling apparatus for the lamps L and L′ in the present instance, comprises a pair of circuit controllers C and C′, which are actuated by the shaft 30. The controller C controls the circuit for the lamps L′, while the controller C′ controls the supply of current to the several groups of lamps L. In addition to the controller C′, I provide a distributor D, which supplies current to any one of the several groups of lamps L, and to that group which illuminates the particular sign section displayed before the window. The circuit controllers C and C′ each comprise a rotating contact member 34 having segments 35 formed of insulating material arranged therein, so that during rotation of the members 34 the conducting portions thereof will contact with fingers 36 supported on the standards 27. The construction of the distributor D is clearly shown in Figs. 6, 7 and 8, and comprises a conduit 37, which is disposed within a recess of the shaft 13 and is rigidly supported therein by an arm 37ª. The inner end of the conduit 37 is provided with a segmental contact 38, which is adapted to wipe any of the terminal contacts 39 when the shaft 13 is rotated.

As clearly shown in Figure 7, the contacts 39 comprise posts which are insulated from the shaft 13 and extend radially from the conduit 37. Each contact 39 co-operates with the contact H, which latter is common to all of the contacts 39, to control any one group of lamps L. The contact H shown in Figure 6 comprises a conducting ring 40 secured to the conduit 37, and a contact finger 41 which constantly bears against the periphery of the ring 40. The main purpose of this contact H is to eliminate the necessity of using the frame or shaft of the exhibitor as part of the circuit, so that the exhibitor may be formed of any suitable material, and not necessarily metal.

The manner in which the lamps L and L' are controlled will be best understood from a consideration of Figure 14. As shown in this figure, G designates a source of current such as a generator, which supplies current to the mains $g$ and $g'$. Assuming that the motor M is energized by closing the manually operable switch S, the mechanism for intermittently moving the reel R is actuated as previously described. Assuming that one of the sign sections 19 is moving to or from the window 16, the lamps L' are illuminated by the following circuit: from positive side of generator G, through main $g$, wire 42, contact fingers 36 the circuit controller C, wire 43, lamps L', wire 44, main $g'$, back to generator. This circuit is maintained until the next sign section moves into displayed position, whereupon the circuit controller C is opened and the circuit controller C' closed. With the closing of the circuit controller C', the group of lamps L directly in the rear of the displayed sign section is illuminated by the following circuit: from main $g$, through circuit controller C', wire 45, contact H, wires 46, 47, lamps L, wire 48, contact 39, segment 38, wire 49, main $g'$ back to the negative side of the generator. It will be understood that the foregoing circuit is for only one group of lamps, and that when another group is illuminated, the circuit will be the same as the previously described circuit with the exception of the wires 47 and 48, and the corresponding contact 39. As soon as the displayed sign section moves from the window 16, circuit controller C' is opened to extinguish lamps L irrespective of the position of the distributor D, while the circuit controller C is again closed to illuminate the lamps L'.

Figure 16:
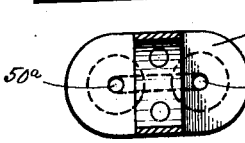
Figure 16 is an enlarged detail view showing in bottom plan, the solenoid shown in Figures 11 and 12.

Referring now to the form shown in Figures 9 to 13, inclusive, I have only shown the reel R and the sign web W' which encircles the periphery of the reel and is preferably secured thereto by suitable fastening members, thus eliminating the use of the reel R' such as shown in the first form of my invention. In this form of my invention, the shaft 13 is fixed and the reel R rotates about the same. T designates a solenoid for intermittently moving the reel R through an arc of 60 degrees. This movement is effected through the medium of the solenoid T by means of a U-shaped core 50, which is connected to one end of a lever 51 pivoted at 52 to a support 53. As shown in Figure 16, the core 50 is snugly fitted within the openings of the windings of the solenoid, the disks on the lower ends of the windings having relatively small openings 50ª so that when the core is drawn into the windings, the resistance offered by the air being forced out through the restricted openings retards the movement of the core thus eliminating any jerking action of the lever 51. The lever 51 is provided with a pawl 54, which engages a ratchet wheel 55, fixed to a shaft 56 and is normally biased to the position shown in Figure 9 by a spring 53ª. Fixed to the same shaft 56 is a Geneva-type gear 57, which meshes with a similar gear 58 fixed to a hub of the reel R. From this construction it will be seen that when solenoid T is energized the pawl 54 partially rotates the ratchet wheel 55, thus causing the reel R' to move through an arc of 60 degrees, through the medium of the gears 57 and 58, as will be understood. At the end of each impulse imparted to the reel R', the teeth of the gears 57 and 58 assume such a position that upon reenergization of the solenoid T the teeth will instantly engage each other to again turn the reel.

As in the first form of my invention, I provide lamps L disposed in the rear of the sign web W' and which are associated with a reflector K to direct the rays through the displayed section of the web. The reflector K is fixed to the shaft 13 and the lamps L being fixed to the reflector, it will be obvious that only one reflector and one set of lamps is necessary to illuminate all of the sign sections. I also provide lamps $L^2$ upon the inner side of the wall 11, such lamps being illuminated only when the lamps L are extinguished.

The second form of my apparatus is designed to be used in a display window, the sign sections having thereon advertising matter relating to the particular merchandise displayed within the window. As an additional means for attracting the attention of the public to the particular merchandise which the exhibitor is advertising, I provide in the front upper border of a show window, (not shown) a group of lamps $L^3$ (Figure 15) corresponding in number to the sign sections to be displayed. Each of these lamps $L^3$ is arranged in such manner within the show window that it is invisible to the spectators, but the disposition of each lamp is such that its rays are projected onto the particular article of merchandise to which the particular sign being displayed refers. In this manner the attention of a spectator is unconsciously directed to each article of merchandise as the corresponding sign is displayed by the exhibitor.

The means for effecting a control of the lamps L, $L^2$, and the lamps $L^3$ in the display window, as well as the solenoid T, comprises a circuit controller Z and a controlling switch indicated generally at Y. As shown in Figure 11, the circuit controller Z comprises a lever 59 pivoted at 60 and biased downwardly by means of a spring 61 to engage a contact 62ª. The lever 59 is moved upwardly against the action of the spring 61 by means of a thermostat 62, and when such lever is in the elevated position, it engages a contact 63. The controller Y comprises a drum 64 and a series of spring contact fingers 65, which bear upon this drum and engage segmental contacts 66. The outermost contact 66$^a$ comprises a ring, which always engages its respective contact finger 65, the remaining contacts 66 being connected to this ring through wires embedded in the drum 64, as is clearly shown in Figure 15.

By referring to Figure 15 the operation of the lamps and solenoid will be understood as follows: With the parts of the circuit controller Z in the position shown in Figure 15, current from generator G is supplied to one group of lamps L by the following circuit: from positive side of generator G, through main $g$, wires 67 and 68, lamps L, wire 69, contact 62$^a$, contact lever 59, wire 70, main $g'$, back to negative side of generator. When this circuit is closed current is also supplied to the thermostat 62, the latter being connected in shunt with the wire 69, as is clearly shown. After a predetermined interval of time has elapsed the thermostat 62 becomes sufficiently heated to expand and move the lever 59 to engage contact 63. With the lever in this position the lamps L are extinguished and the thermostat 62 is no longer energized. However, another circuit is now completed which energizes the lamps $L^2$ and the solenoid T. This circuit is as follows: from wire 67, through the windings of solenoid T, wire 71, lamps $L^2$, contact 63, lever 59, wire 70, back to generator. This circuit is maintained until the thermostat 62 cools, which allows the spring 61 to force the lever into its normal position, thus opening the contact 63 and disrupting the circuit. It will thus be seen that the lamps $L^2$ are illuminated only when the reel is being rotated, while the lamps L are illuminated only when the reel is at rest.

The drum 64 being fixed to the reel R for rotation therewith, it is evident that by arranging the segmental contacts 66 in a predetermined order, the lamps $L^3$ will be illuminated, according to which particular group of lamps L is illuminated. It is thought that a detailed description of the various circuits for accomplishing this end is unnecessary, as they are clearly shown in Figure 15, and should be readily understood.

Figures 18, 19:
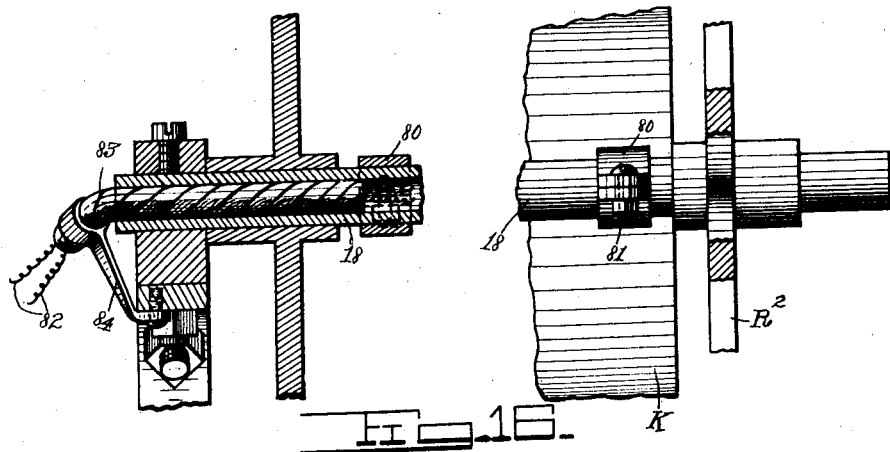
Figure 18 is a fragmentary vertical sectional view of the reel shown in Figure 17.
Figure 19 is a view showing the reverse side of the reel shown in Figure 18.

Referring now to Figures 17 to 19 inclusive, $R^2$ designates generally a reel which is identical in construction to the reel $R'$ shown in Figure 1 and is adapted to be substituted therefor. In the present instance, however, the reel $R^2$ is loosely mounted upon the shaft 18 so that it rotates independently of the shaft. As shown in Figure 17, a reflector K is fixed to the shaft 18 by means of brackets 80 which embrace and are caused to snugly engage the shaft by means of bolts 81. In the clamped position of the brackets 80, the reflector K assumes a substantially horizontal position so that it is disposed directly in rear of and on a line with the window 16 of the wall 11. Arranged between the sections 33 of the reflector K is a set of lamps $L^4$ which are adapted to illuminate the several sections 19 of the web W, as will be understood. Current is supplied to the lamps $L^4$ by conductors 82 which extend through a cable 83 arranged within the shaft 18 and supported at one of its ends by a bracket 84.

As in the second form of my invention, by making the reflector K and lamps $L^4$ fixed, and the reel $R^2$ movable, only one reflector and on set of lamps is necessary to illuminate the several sign sections of the web W.

From the foregoing description taken in conjunction with the accompanying drawing, it will be manifest that I provide three simple and efficient forms of changeable exhibitors, wherein the illuminating means are automatically controlled to maintain the exhibitor illuminated at all times with the least consumption of current.

Although I have herein shown and described only three forms of changeable exhibitors embodying my invention, it is to be understood that various changes and modifications may be made therein without departing from the spirit of the invention and the spirit and scope of the appended claims.

What I claim is:—

1. In combination, a changeable exhibitor including a plurality of signs adapted to be successively displayed for predetermined intervals, a group of lamps in the rear of the signs when in displayed position, a second group of lamps exteriorly of the signs, a source of current having a circuit adapted to include both groups of lamps, and a circuit controller comprising, a pivoted lever, a contact arranged below the lever and connected to one group of lamps, a second contact above the lever and connected to the other group of lamps, a spring for biasing the lever into engagement with one contact, and thermostatic means for moving said lever against the action of said spring into engagement with the other contact.

2. In combination, a changeable exhibitor including a plurality of signs adapted to be successively displayed for predetermined intervals, and a solenoid for actuating the exhibitor, a group of lamps in the rear of the signs when in displayed position, a second group of lamps exteriorly of the signs, a source of current having a circuit adapted to include the solenoid and both groups of lamps, and a circuit controller operable to connect the solenoid and one group of lamps to the source of current when in one position, and to connect the other group of lamps to the source of current when in another position.

3. A changeable exhibitor comprising, a rotatable reel, signs carried by the reel, and means for intermittently rotating said reel comprising, a solenoid comprising cores snugly fitted within the windings of the solenoid and discs on the lower ends of the windings formed with relatively small openings, and means for intermittently energizing the solenoid.

T. LARIMORE EASLEY.